J. F. WITTEMANN.
METHOD OF FINISHING AND PREPARING BEVERAGES.
APPLICATION FILED MAY 2, 1911.
1,029,838.
Patented June 18, 1912.
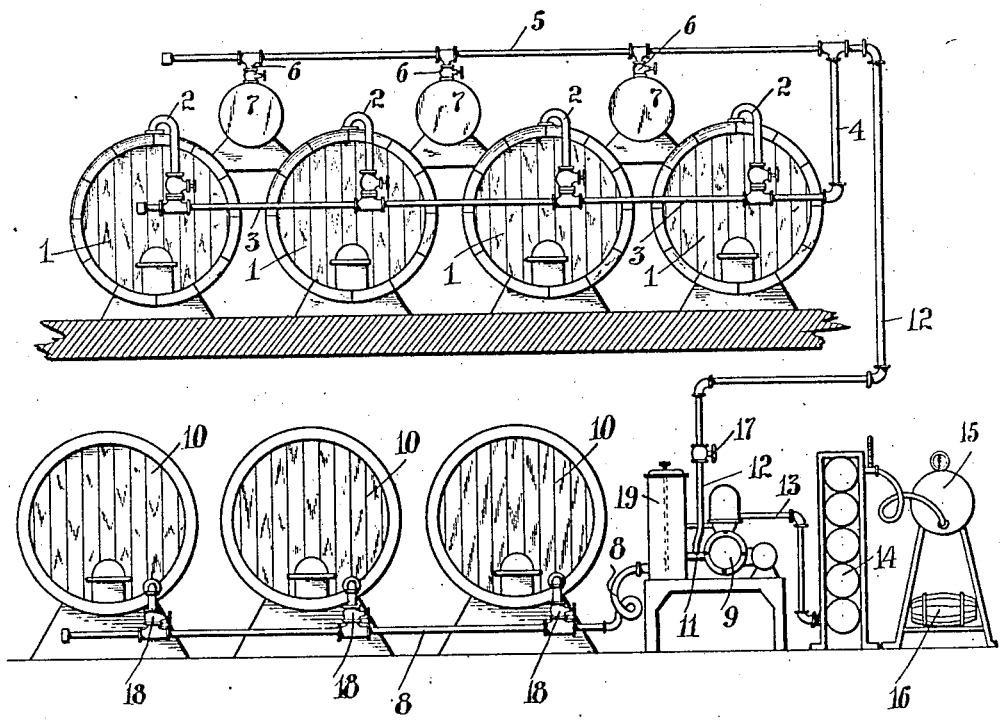

UNITED STATES PATENT OFFICE.

JACOB FREDERIC WITTEMANN, OF LAKEWOOD, NEW JERSEY.

METHOD OF FINISHING AND PREPARING BEVERAGES.

1,029,838. Specification of Letters Patent. Patented June 18, 1912.

Application filed May 2, 1911. Serial No. 624,549.

*To all whom it may concern:*

Be it known that I, JACOB F. WITTEMANN, a citizen of the United States, and a resident of Lakewood, in the county of Ocean and State of New Jersey, have invented certain new and useful Improvements in the Methods of Finishing and Preparing Beverages, of which the following is a specification.

The invention relates to a new and improved system or method of enhancing the value of fermented beverages such as beer, wine, cider, etc., by their treatment with the volatile products of the fermentation of such beverages.

The object of my invention is to treat such beverages when they are matured, clarified or filtered, either or all, to the required standard, but lacking sufficient incorporation of carbonic acid gas and fermentation ethers, generated during the fermentation of such liquids to impart to them the desired degree of effervescence, flavor and improved character by incorporating with such beverages such volatile fermentation products while the latter remain substantially in the same condition as when generated by the fermentation of such beverages, but at such density or pressure and temperature that the stated object shall be attained, namely, that the more or less quiescent state in which such beverages mature and clarify most readily, is transformed into a condition of effervescence or a foam-maintaining state at a temperature at which they are usually consumed, and that the more or less insipid flavor and taste with which such beverages are usually allowed to mature and clarify are improved by the reabsorption of the flavoring ethers which had previously been thrown off such or a similar beverage together with carbonic acid gas during the progress of its fermentation. While the impregnation of fermented beverages with fermentation gas is well known in the brewing art it has heretofore been attended by more or less disintegration, deterioration or other undesirable change in the character or composition of this complex gas, owing to improper treatment thereof, such as overheating during dry mechanical compression or compression in the presence of insufficient cooling medium, or its contact with a more or less impure cooling medium or with disintegrating metal surfaces, or owing to its degeneration or decomposition while kept in storage under high pressure. By my improved method all such undesirable changes or alterations in the composition, flavor and taste of the volatile products of fermentation are avoided when they are incorporated in the desired proportion with a matured, but as yet more or less unmerchantable, beverage, owing to its lack of a sufficient proportion of such gas. The compression of the gas to the necessary density in which it is capable of producing the desired effect in such beverages is preferably effected in part by its retention within the fermenting vessel, up to a pressure within a safety limit, dictated by the nature or construction of such vessel, and in part or wholly while in direct contact with the beverage into which it is to be incorporated by a liquid- and gas-forcing mechanism, such as a force pump.

As this invention will find its principal use in the manufacture of beer, I shall hereafter use the term "beer" as a generic term for all similar beverages and in the accompanying drawing show an embodiment of one apparatus for carrying out my new and improved method or process as it would be used in a brewery; but I in no wise confine the use of my invention to beer only, as the process can as readily be applied to the manufacture of other similar beverages and by the use of other constructions of apparatus according to varying conditions or requirements, yet carrying out the same method in principle.

Referring now to the drawings, 1 represents a series of casks of any well-known or conventional construction, which are filled to about three-fourths of their height, more or less, with wort undergoing fermentation, said casks being kept open at the top so long as air or impure gas is expelled by the gas at first generated, but closed as soon as the air is expelled, so that this fermentation takes place under pressure which may be allowed to rise as high as the safety of the fermenting vessels may dictate, and is preferably maintained at a fairly uniform pressure throughout the course of the fermentation. Each fermenting cask 1 is connected by a suitable valved tubular connection 2 with a collecting tube or pipe 3 common to all the casks, so that the gas of fermentation from all the fermenting casks 1 passes through a branch tube 4 to a tube 5, from which connections 6 lead to a series of gas-collecting tanks 7 in which the gas generated is collected.

When the fermentation of the beer has been completed or has reached that stage, in the judgment of the brewer, insuring to it the desired condition, the beer is racked off the sediment in the fermenters in any well-known and suitable manner, to other vessels 10, commonly known as maturing or settling vats or casks, in which it remains a greater or less length of time, undergoing either a so-called secondary fermentation or merely clarification, or both, and from which the beer may be reracked into other storage vessels for further elimination of sediment, or it may be racked directly into shipping packages, when it has reached the proper maturity and clarification, being subjected to my new finishing process hereinafter described, in the course of such racking, into shipping packages.

While transferring the matured beer from the fermenting casks 1 or from any of the maturing or settling vessels 10 into another such vessel or to the racker 15, the beer may be filtered by any well-known filtering appliances, the construction or use of which forms no part of the present invention. The beer to be finished and racked off ready for the consumer is drawn from one or more of the fermenters if matured and clarified therein or from the maturing or settling casks or vats 10 by a compressor pump 9 of any serviceable construction, through a tube connection 8 and outlet valve 18. The inlet neck 11 of the pump 9 is connected by a suitably valved tube connection 12 with the gas-conducting tube 5 or 4 or both and by this pump 9 the beer, together with a predetermined proportion of fermentation gas is forced under the pressure created and maintained by the pump 9 through the tube 13 into and through the closed conduit counter-current cooler 14 of any suitable construction and to and through a counter-pressure racker 15 of any suitable construction, from which racker it is drawn into kegs or other suitable shipping or distributing packages 16 or to and into reserve casks for finished beer against a counter pressure of a gaseous fluid in any well-known manner. The quantity of fermentation gas under pressure admitted to the pump is regulated by a valve 17 in said tube 12 so that the pump 9 constantly draws a predetermined quantity of beer and at the same time a predetermined quantity of gas and forces the mixture through the discharge or delivery pipe 13 to the cooler 14 and through the same against the counter-pressure of racker 15 or within a reserve storage cask for finished beer, whereby the union of liquid and gas, effected by their commingling within the pump, is made perfect during their passage through the said closed conduit. The quantity of beer and quantity of gas admitted to the pump are both regulable so that an attendant can adjust the valves to produce the desired condition of effervescence or foam-maintaining state at the average temperature at consumption of the beer. The pump 9 is preferably provided with a suitable pressure relief device 19 of conventional construction, so that a uniform pressure is maintained within the conduit from the pump to and through the cooler 14 and from the latter to and through the racker, so that uniformity of the operation and its effect are secured.

The gas accumulating in the gas collectors 7 or fermenting casks 1 is at a more or less high temperature, that is to say, the fermentation gas is comparatively warm, but as these gas-collectors and fermenting casks are generally contained within refrigerated cellars the temperature of the gas in these collectors and fermenting casks is gradually reduced to that of the atmosphere surrounding them, more or less. Usually the gas will remain warmer than the beer, the latter ordinarily being reduced to a temperature near the freezing point of water, so that the temperature of the mixture of beer and gas in the pump 9 is raised more or less above that of the beer before it entered the pump, but as this mixture of beer and gas is forced constantly under the pump pressure, through conduit 13 and cooler 14 its temperature is reduced to the original temperature of the beer in storage or still lower.

Having described my invention, what I claim as new and desire to secure by Letters Patent is:—

The method of finishing and preparing beverages for the market, which consists in conducting into a liquid forcing mechanism, in the nature of a pump, in predetermined proportions; natural fermentation gas and a beverage, the temperature of the beverage being lower than that of the natural fermentation gas and forcing this mixture of natural fermentation gas and beverage under pressure through a device for cooling the mixture of such natural fermentation gas and beverage, and conducting this mixture directly into storage or shipping packages while under the pressure exerted by the said liquid forcing mechanism in one continuous operation, substantially as set forth.

Signed at New York in the county of New York and State of New York this 24th day of April A. D. 1911.

JACOB FREDERIC WITTEMANN.

Witnesses:
 HERMANN COLBERG,
 ANNA E. SCHULER.